Figure 1:
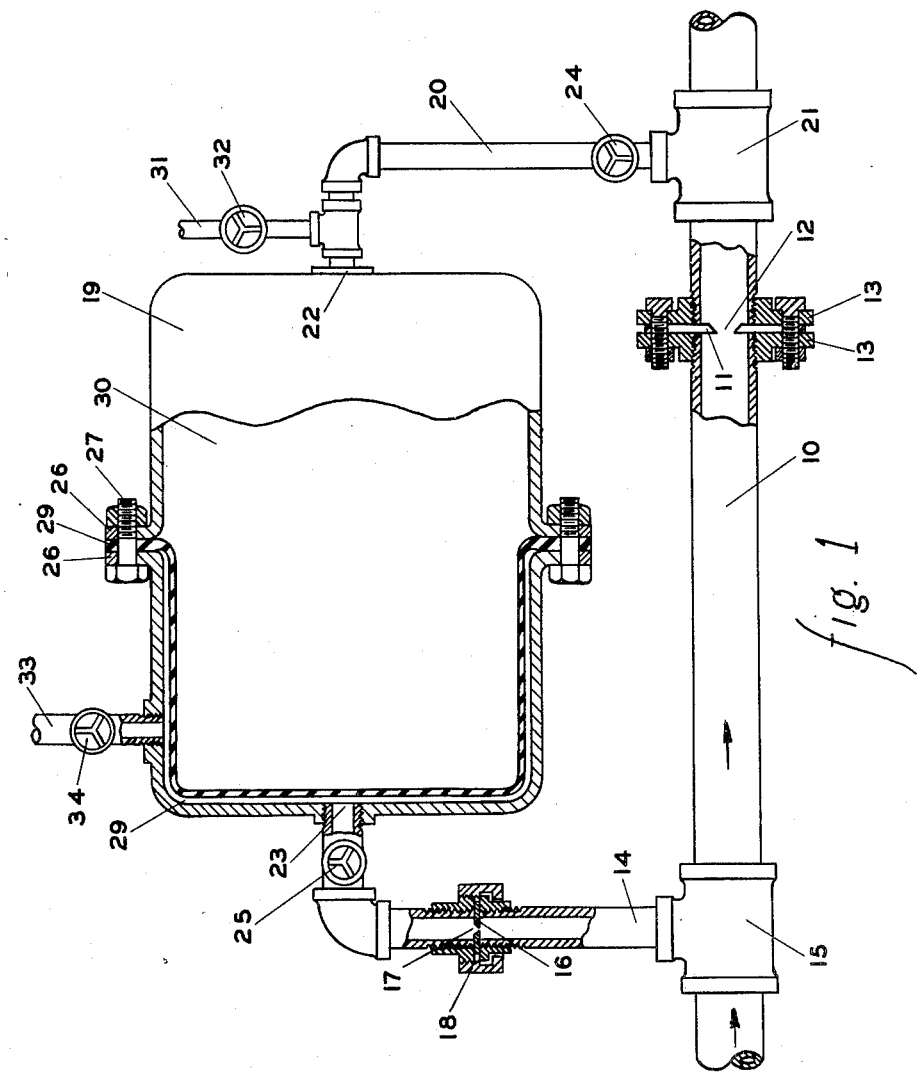

Patented Nov. 18, 1952

2,618,510

UNITED STATES PATENT OFFICE 2,618,510

FLUID PROPORTIONING APPARATUS

Lindley E. Mills, Kalamazoo, Mich.

Application May 25, 1946, Serial No. 672,189

6 Claims. (Cl. 299—85)

This invention relates to fluid proportioning apparatus, particularly to apparatus whereby a fluid can be mixed in constant proportion with another fluid flowing in a conduit.

Many types of equipment have been devised for feeding or injecting one fluid, referred to herein for convenience as a first or treating fluid, into a stream of another fluid, referred to herein for convenience as a raw fluid, flowing in a conduit utilizing the pressure of the raw fluid to effect such feeding, but these have invariably been complicated to construct, inaccurate in maintaining the ratio of treating fluid to raw fluid constant over more than a narrow range of pressure of the flowing raw fluid without adjustment, cumbersome to operate, or not adapted to inject a treating fluid having properties, such as viscosity, differing widely from those of the raw fluid. Such devices as have heretofore been known are not generally applicable to the injection of a treating fluid comprising a suspension of a solid in a liquid into a stream of raw fluid flowing in a conduit.

For these and other reasons, it has heretofore usually been necessary, when a mixture of a raw fluid and a treating fluid has been desired, either to use synchronized displacement type proportioning pumps or to mix the fluids in an auxiliary tank or receptacle and then to pump the mixture under pressure to the point desired. Such procedures are practiced, for example, in the treating of boiler feed and municipal water supplies wherein the softening is accomplished by the addition of chemicals to the water. Also, in the preparation of insecticidal and fungicidal spray fluids for agricultural and other uses, it is common practice to mix a concentrated preparation with water in a tank and then to pump the mixture to the spray head. The disadvantages of such procedures are apparent.

It is therefore an object of the present invention to provide new and novel apparatus useful for accurately proportioning and mixing fluids.

It is a further object of the invention to provide apparatus for feeding a treating fluid in constant proportion into a raw fluid flowing in a conduit which is accurate over a wide range of pressures and rates of flow of the raw fluid.

Still a further object is to provide apparatus for mixing a treating fluid with a raw fluid flowing in a conduit wherein the pressure required for introducing the treating fluid into the flowing stream of raw fluid is derived from the pressure of the raw fluid itself in the conduit.

Still another object is to provide apparatus for accurately mixing fluids having widely differing physical properties.

A further object is to provide apparatus for injecting a treating fluid into a stream of raw fluid flowing in a conduit wherein the pressure of the raw fluid is utilized to effect the injection and wherein the proportion of treating fluid to raw fluid is independent of the rate of flow or pressure of the raw fluid and of differences in physical properties of the two fluids.

These and related objects are accomplished readily and economically by providing a conduit, herein referred to as a first conduit, for conveying raw fluid under pressure in one direction and having flow restriction means, herein referred as a first flow restriction means, therein of a type hereinafter described, and a fluid tight container or reservoir for the treating fluid. Another conduit, herein referred to as a second conduit, is provided with one end thereof in communication with the first conduit at a point upstream of, or on the high pressure side of, the flow restriction means in the first conduit, and with its other end in communication with the treating fluid reservoir. The second conduit is provided with flow restriction means, herein referred to as a second flow restriction means, therein of the same type as the flow restriction means in the first conduit. Another conduit, herein referred to as a third conduit, is also provided with one end thereof in communication with the first conduit at a point downstream of, or on the low pressure side of, the flow restriction means therein and with its other end in communication with the treating fluid reservoir at a point substantially removed from the point of communication therewith of the second conduit. The third conduit is of such diameter throughout as to offer a minimum of resistance to the flow of treating fluid through it at the rate required in the operation of the device.

A flexible partition or diaphragm is provided in the treating fluid reservoir which separates the reservoir into chambers, one of which, herein referred to as a first or raw fluid chamber, consists of the portion of the reservoir lying on one side of the diaphragm around the point of communication of the second conduit with the reservoir, and the other of which, herein referred to as a second or treating fluid chamber, consists of the portion of the reservoir lying on the other side of the diaphragm and around the point of communication of the third conduit with the reservoir. The flexible diaphragm, which may be of rubber, polyethylene, polyvinylidine chloride, ethyl cellulose, cellulose acetate, polyvinyl chloride, copolymers of styrene and butadiene, or of other material insoluble in and chemically resistant to the fluids being mixed, is preferably formed in a shape and situated within the reservoir so as to lie substantially along one half of the inner surface of the reservoir wall without stretching when extended in one direction, and to lie in like manner along the other half of the inner surface of the reservoir wall when flexed so as to extend in the other direction, thus permitting the raw fluid chamber and the treating fluid chamber to vary in size according to the amounts of the respective fluids therein.

It is apparent that the flexible diaphragm may be of any suitable form or shape provided it is not stretched tightly across the reservoir and may be flexed from one position to another to allow variation in the size of the raw fluid and treating fluid chambers without stretching. In some instances the use of a flat sheet of flexible material may be used and a slack portion thereof positioned within the reservoir to provide sufficient material for flexing the diaphragm back and forth. In other instances a flexible bladder or bag may be used, the inside of which constitutes one of the chambers, the other chamber lying outside the bag. The diaphragm should require a minimum of work to flex it from one extreme position to the other.

The flow restriction means located in the first and second conduits are each of a type such that the volume rate of flow of a liquid therethrough is expressed substantially by the equation $$R = A \cdot dp \cdot k$$

wherein R is the volume rate of flow of a fluid through the flow restriction means, A is the area of the opening through the flow restriction means, dp is the fluid pressure drop through the flow restriction means, and k is a constant which is the same for any one fluid.

A preferred type of flow restriction means comprises an orifice meter, one form of which consists of a square-edge circular opening in a thin metal plate positioned transversely across the conduit. It is known that the volume rate of flow of a particular liquid through such an orifice, provided that for high rates of flow of fluid on the upstream side of the orifice the conduit conveying the fluid to the orifice permits unrestricted straight line flow of the fluid before it enters the orifice for a distance equal to at least six to eight times the diameter of the conduit, is substantially proportional only to the area of the orifice and to the pressure drop through the orifice, i. e., to the difference between the pressure of the fluid on the upstream side of the orifice and the pressure of the fluid on the downstream side of the orifice. Other forms of orifice meters include a thick plate with the downstream edge of the orifice beveled, a rounded-edge orifice and a nozzle type orifice meter. The proper location of orifices in conduits with respect to their location in the vicinity of valves and fittings has been described by the Committee on Fluid Meters of the American Society of Mechanical Engineers and, generally speaking, the specifications there given should be followed in the present instance. However, any other type of flow restriction means having characteristics meeting the conditions of the formula given may be employed. It should be pointed out that partially or completely opened valves do not provide flow restriction means meeting the above requirements.

When employing restriction means, such as those described, it is apparent that since the same fluid, i. e. the raw fluid, flows through the flow restriction means in both the first and second conduits, and since the pressure drop through each of the flow restriction means is the same, the ratio of the volume rate of flow of the raw fluid through the restriction means in the second conduit to the volume rate of flow of raw fluid through the restriction means in the first conduit is equal to the ratio of the areas of the two respective orifices. Since the raw fluid flowing through the second conduit enters the raw fluid chamber and, by flexing the flexible diaphragm, displaces an equal volume of treating fluid from the treating fluid chamber which passes by way of the third conduit into the stream of raw fluid flowing in the first conduit, the volume ratio of treating fluid to raw fluid in the resulting mixture is equal to the ratio of the areas of the orifices in the second and first conduits, respectively, and is independent of the rate of flow of the raw fluid through the first conduit, or of the pressure drop through the restriction means, or of the respective natures of the two fluids. The device functions automatically to maintain this ratio constant as long as raw fluid flows. By selecting orifices having appropriate areas for installation in the first and second conduits a mixture of two fluids in any desired proportion may be prepared with a high degree of accuracy and without attention other than to keep the treating fluid chamber supplied with treating fluid.

A modification of the invention contemplates the feeding or two or more treating fluids into a raw fluid flowing in a conduit. In such case a reservoir and flexible diaphragm together with conduits corresponding to the second and third conduits described above, with an appropriate orifice in that corresponding to the second, are provided for each treating fluid.

Figure 2:
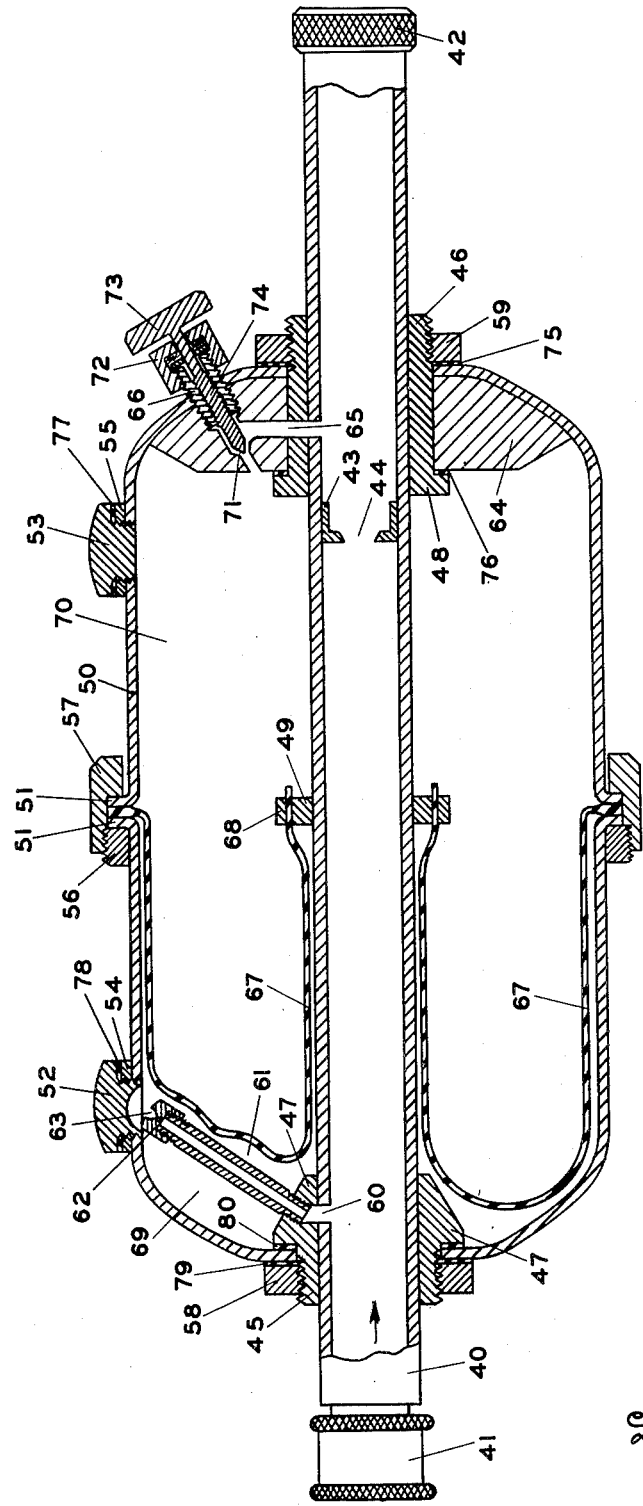

The invention may be clearly understood by reference to the accompanying drawing wherein for the sake of clarity, certain of the features are shown on a somewhat exaggerated scale and wherein Figure 1 is an elevation, partly in section, of apparatus for feeding a treating fluid into a stream of raw fluid flowing in a conduit, and Figure 2 is a sectional view, partly in elevation, of apparatus for feeding a fluid insecticidal concentrate into a stream of water flowing in a conduit and for spraying the resulting diluted insecticide.

Referring now to Figure 1 there is illustrated a first conduit 10 for conveying a raw fluid in the direction indicated by arrows. Within the conduit 1 there is positioned a metal plate 11 with a circular orifice 12 therein, the edge of the circular opening being beveled on the downstream side. The plate 11 is fixedly mounted within the conduit 10 in any convenient manner, such as by being clamped between flanges 13 serving to join sections of the conduit 10.

A second conduit 14 is provided communicating at one end with the first conduit 10 at a point 15 upstream from the orifice 12, preferably at a distance therefrom at least eight times the internal diameter of the conduit 10. Such point of communication 15 is herein referred to as a point of high pressure within conduit 10. The second conduit 14 is preferably provided with a shut-off valve 25. The conduit 14 communicates at its other end with a treating fluid reservoir 19. The second conduit 14 has a metal plate 16, containing a circular orifice 17, fixedly positioned therein, as by being clamped between the members of a pipe union 18 for joining sections of the second conduit 14. The orifice 17 is preferably removed from the point of communication 15 of the first and second conduits 10 and 14 by a distance at least eight times the internal diameter of the second conduit 14.

A third conduit 20 is provided communicating at one of its ends with the conduit 10 at a point 21, herein referred to as a point of low pressure in conduit 10, downstream from the first orifice 12. The conduit 20 communicates at its other end with the treating fluid reservoir 19 at a point 22 removed from the point of communication 23 of the conduit 14 with the reservoir 19. The third conduit 20 is preferably provided with a shut-off valve 24.

The treating fluid reservoir 19 comprises a tank of suitable size, preferably divided into two similar half portions each with flanges 26 which may be joined together, as with bolts 27. A flexible diagram 28, resistant to attack by the treating and raw fluids, is provided and is preferably formed, as by molding, into a cup- or boot-shaped member to fit closely without stretching over one half of the inner surface of the reservoir 19. In any event the diaphragm 28 is not stretched tightly across the reservoir 19, but has considerable slack so that it may be flexed readily, and without stretching, from one fully extended position to another in such a way as to lie substantially along either half of the inner wall of the reservoir 19. The diaphragm 28 is provided with a flange 29 around its edge which is clamped between flanges 26. The flexible diaphragm 28 divides the reservoir 19 into a raw fluid chamber 28, which receives raw fluid entering the reservoir 19 by way of the second conduit 14 from a point 15 on the upstream side of the orifice therein, and into a treating fluid chamber 30 from which treating fluid passes by way of the third conduit 20 into the first conduit 10 at a point downstream from the orifice 12 therein. The flexible diaphragm 28 serves to keep raw fluid in the raw fluid chamber separate from treating fluid in the treating fluid chamber.

It is apparent that when the diaphragm 28 is fully extended in one direction, the raw fluid chamber 29 will have a very small volume and the treating fluid chamber 30 will be substantially equal in volume to the volume of the reservoir 19, these relationships being reversed when the flexible diaphragm is flexed so as to occupy its other extreme position. Furthermore, depending upon the position of the flexible diaphragm 28 between its two extreme positions, the raw fluid chamber 29 and the treating fluid chamber 30 may each vary in size, the total volume of the two being at all times substantially equal to the volume of the reservoir 19.

A treating fluid supply conduit 31 and shut-off valve 32 are provided, communicating either directly with treating fluid chamber 30 or by way of a section of conduit 20 between valve 24 and reservoir 19, through which to supply treating fluid to the treating fluid chamber 30. A raw fluid drain 33 and shut-off valve 34 are provided, communicating either directly with raw fluid chamber 29 or by way of a section of the second conduit 14 between valve 25 and reservoir 19, for draining raw fluid from the raw fluid chamber 29.

In operation, with treating fluid in the treating fluid chamber 30 and with raw fluid flowing in the first conduit 10, and with valves 32 and 34 closed and valves 24 and 25 open, a portion of the raw fluid flows through the second conduit 14 and orifice 17 into the raw fluid chamber 29 where it displaces the flexible diaphragm 28 thus forcing an equal volume of treating fluid from the treating fluid chamber 30 through the third conduit 20 into the stream of raw fluid flowing therein, the ratio of treating fluid and raw fluid thus mixed being the same as the ratio of the area of the orifice 17 to the area of the orifice 12 and being independent of the rate of flow of raw fluid in the first conduit 20.

When it is necessary to introduce a new supply of treating fluid into the treating fluid chamber 30 this is accomplished by closing valve 24, and valve 25 if such is provided, and opening valves 32 and 34. Treating fluid is then introduced into treating fluid chamber 30 by way of conduit 31, an equal volume of raw fluid flowing out of the raw fluid chamber 29 through drain conduit 33. Valves 32 and 34 are then closed and valves 24 and 25 opened. For best results and to prevent surging, little or no air or other gas should be present in either the raw fluid or treating fluid chambers. For continuous operation a pair of raw fluid reservoirs 19 may be provided communicating with conduit 20 in the manner shown, one of these being in operation while the other is being charged with treating fluid.

Referring to Figure 2 there is illustrated apparatus embodying the features of the invention and adapted to the mixing of an insecticidal concentrate, or treating fluid, with a stream of water, or raw fluid, flowing in a conduit and to the spraying of plants with the resulting dilute insecticidal spray. A first conduit 40, corresponding to the first conduit 20 of Figure 1, is provided for conveying water under pressure in the direction indicated by the arrow. One end of the conduit 40 is provided with a connection 41 for a hose or other source of water supply and the other end of the conduit 40 is provided with a spray head or nozzle 42. Within the conduit 40 there is positioned a diaphragm 43 containing a circular orifice 44, the edge of the orifice being beveled on the downstream side. The diaphragm 43 may conveniently consist of a shallow, cup-shaped metal element which fits tightly into the conduit 40 and which has the orifice 44 in the bottom of the cup. The member is forced into the conduit 40 and then brazed in place so as to be firmly fixed in its position.

Two elongated ring members 45 and 46, each threaded externally at one end and having a projecting shoulder 47 and 48 at the other end, and fitting closely around the conduit 40 are brazed to the conduit at points on each side of the orifice 44 with the ends having shoulders facing one another. A narrow ring 49 having an outside diameter approximately the same as that of the projecting shoulder 48 of ring member 46 and fitting closely around the conduit 40 is brazed to the conduit 40 at a point approximately midway between the ring members 45 and 46.

An elongated circular tank 50, divided transversely into two approximately equal sections and having flanges 51 formed around the joining edges of the sections is provided and fitted with ports closed by filler caps 52 and 53 in each section. Reenforcing ring members 54 and 55 may be provided and brazed around the ports in the case of thin-walled tanks to furnish sufficient stock for satisfactory threads to receive the threaded filler caps 52 and 53. Threaded clamping rings 56 and 57 are provided with which the flanged edges of the two sections of the tank 50 can be drawn firmly together.

A circular opening is formed in the center of the end of one section of the tank 50 so that the section may be slid easily over the end of the conduit 40 upstream from the orifice 44 and over the threaded portion of the member 45, so as to rest snugly against the shoulder 47 of the member 45. A nut 58 screwed on the threaded portion of the ring member 45 serves to hold the section of the tank 50 securely fixed with respect to the conduit 40.

The ring member 45 nearest the source of water supply and the wall of the conduit 40 are drilled to provide a passageway 60 into which is fixed, as by threads, one end of a second conduit 61. The conduit 61 is fitted with a removable cap at its other end through which is drilled a small hole or second orifice 63. For convenience the conduit 61 is positioned so that the cap 62 is accessible for removal by removing filler cap 52.

The other section of the tank 50 which is clamped to ring member 46 by the nut 59 is provided with a disk-shaped member 64 thickened at the center and fitting closely the inside surface of the end of the section. The disc-shaped member 64 is brazed to the end of the section of the tank 50 and contains a circular opening coinciding with an opening in the center of the end of the tank section. The disc-shaped member 64 abuts the shoulder 48 and is sufficiently thick so that it may be drilled to provide a third conduit 65, fitted with a valve seat 71, leading from inside the tank through a coinciding hole in the wall of conduit 40 into the first conduit 40. A valve stem 66, cooperating with valve seat 71 and attendant valve body 74, packing gland 72 and valve wheel 73, serves to close conduit 65 and prevent the flow of fluid therethrough when desired.

A flexible diaphragm 67 of sheet rubber or other flexible sheet material is provided, which is resistant to water and to the insecticidal concentrate which it is desired to use in the apparatus, and which is molded in the shape of a cup or boot with a hollow tube in the center. The hollow tube is large enough so that it will slide easily over the ring member 49 and lie loosely around the conduit 40 between the ring 49 and one end of the tank. The outer wall of the cup or boot lies substantially along the inner wall of one or the other sections of the tank 50. The central tube of the cup-shaped diaphragm 67 is clamped around the ring member 49 as by a clamping ring 68 and the outer rim of the diaphragm 67 is clamped between the flanged edges 51 of the two sections of the tank 50 by means of the clamping rings 56 and 57.

The flexible diaphragm 67 thus divides the tank 50 into two chambers 69 and 70. The chamber 69 is the portion of the tank 50 lying between the flexible diaphragm 67 and the section of the tank which is clamped to the ring member 45. This water chamber 69 corresponds to the raw fluid chamber 29 of Figure 1. The other chamber 70 consists of the portion of the tank 50 lying between the flexible diaphragm 67 and the section of the tank 50 which is clamped to ring member 46. This insecticidal concentrate chamber 70 corresponds to the treating fluid chamber 30 of Figure 1. Although the sum of the volumes of the water chamber 69 and the insecticidal concentrate chamber 70 is equal to the volume of the tank 50, the volume of each chamber may vary according to the relative volumes of water and of insecticidal concentrate, respectively, therein. The flexible diaphragm 67 serves at all times to keep the water in chamber 69 and the insecticidal concentrate in chamber 70 separate from one another. Appropriate gaskets 75, 76, 77, 78, 79 and 80 are provided to prevent leakage of fluid from the apparatus and to prevent undesired passage of fluid between the chambers 69 and 70 and the conduit 40.

In operation, a concentrated insecticidal suspension, emulsion or solution is placed in the insecticidal concentrate chamber 70, the water chamber 69 is filled with water, filler caps 52 and 53 are screwed tight, and water is caused to flow through the first conduit 40 and the first orifice 44 in the direction indicated by the arrow. Valve 66 is then opened. A certain proportion of the water entering conduit 40 is diverted through the opening 60 and flows through the second conduit 61 and the second orifice 63 into the water chamber 69. This volume of water displaces the flexible diaphragm 67 and forces an equal volume of insecticidal concentrate out of the insecticidal concentrate chamber 70 through the third conduit 65 and into the first conduit 40, where it mixes with the water flowing in the latter and issues from the spray head 42 as a diluted insecticidal spray. The ratio of the volume of water flowing through the second orifice 63 and, therefore, of the volume of insecticidal concentrate flowing out of the insecticidal concentrate chamber 70 through the conduit 65 into the first conduit, 40, to the volume of water flowing through the first orifice 44 in the first conduit 40 is thus constant regardless of the rate of flow of water through the first orifice 44.

When the insecticidal concentrate in the insecticidal concentrate chamber 70 is exhausted, and it is desired to recharge the apparatus with fresh insecticidal concentrate, the flow of water through the conduit 40 is arrested, shut-off valve 66 is closed, and filler caps 52 and 53 are removed. Insecticidal concentrate is then poured into the chamber 70 through the port left by removing filler cap 53 and a corresponding volume of water is forced out of the chamber 69 through the port left by removing filler cap 52. During this operation the apparatus should be held level or so that the port in the insecticidal chamber 70 is slightly higher than the port in the water chamber 69. When the desired amount of insecticidal concentrate has been added, filler caps 52 and 53 are replaced, water is again caused to flow through conduit 40 and the valve 66 is opened. Should it be desirable to spray a plant or other object using water without the addition thereto of insecticidal concentrate, it is only necessary to close the valve 66.

The apparatus of the invention may be utilized for accurately mixing or proportioning substantially any flowable fluids, including clear liquids, suspensions or emulsions regardless of differences in their respective viscosities. The term fluid as used herein excludes gases.

Particular applications wherein the apparatus may be used to advantage include, in addition to the preparation and use of dilute insecticidal sprays just mentioned, the dilution and spraying of soluble fertilizers on plots of soil, the dilution for use of chemical reagents of various sorts, the mixing of chemical reagents in predetermined proportions in chemical processes, the preparation for use of dilute soap or other cleaning solutions, the dilution of concentrated solutions of photographic chemicals for use in blue print work, the introduction of softening and sterilizing agents into household and municipal water supplies, the treating of boiler feed water, the preparation for use of dilute solutions or suspensions of industrial or agricultural fungicides, and many others. Agricultural fungicidal or insecticidal concentrates which may be diluted with water for use employing the apparatus of the invention include 40 per cent aqueous nicotine sulfate, strong solutions of liquid lime-sulfur, concentrated emulsions of mineral oil in water, suspensions, emulsions or solutions containing 1,1-di-(4-chlorophenyl)-2,2,2-trichloroethane, water suspensions of wettable sulfur, lead arsenate, calcium arsenate, Paris-green, Bordeaux, ferric dimethyl-dithiocarbamate, zinc arsenate, cryolite, or hydrated lime, aqueous preparations containing dinitrophenol compounds, solutions of salts of chlorophenols, and many others.

I claim:

1. Apparatus for introducing a treating fluid in a substantially constant proportion into a stream of raw fluid flowing in a conduit comprising, in combination, a first conduit for conveying a raw fluid in one direction, a first orifice meter positioned in the first conduit, a fluid-tight container, a flexible diaphragm in the fluid-tight container dividing the container into a raw fluid chamber and a treating fluid chamber, a second conduit communicating at one end with the first conduit at a point upstream from the first orifice meter and at its other end with the raw fluid chamber, a second orifice meter positioned in the second conduit, and a third conduit communicating at one end with the treating fluid chamber and at its other end with the first conduit at a point downstream from the first orifice meter and having a diameter sufficiently great to cause it to offer substantially no resistance to the flow of treating fluid through it at the rate required in the operation of the device.

2. Apparatus as claimed in claim 1 wherein the flexible diaphragm is insoluble in and chemically resistant to the action of the raw fluid and the treating fluid.

3. Apparatus as claimed in claim 1 wherein the third conduit contains a shut-off valve.

4. Apparatus as claimed in claim 1 wherein the second and third conduits each contain a shut-off valve.

5. Apparatus as claimed in claim 1 wherein the flexible diaphragm in the fluid-tight container is formed to fit substantially one-half the inner surface of the container when extended in one direction and may be flexed to fit substantially the other half of the inner surface when extended in the other direction.

6. Apparatus as claimed in claim 1 wherein the flexible diaphragm is constructed from a substance insoluble in and chemically resistant to water and to the fluid concentrate and selected from the class consisting of rubber and synthetic organic polymers and copolymers.

LINDLEY E. MILLS.

REFERENCES CITED

The following references are of record in the file of this patent:

UNITED STATES PATENTS

| Number | Name | Date |
| --- | --- | --- |
| 1,030,119 | Overbeke | June 18, 1912 |
| 2,310,051 | Baer | Feb. 2, 1943 |
| 2,323,341 | McGill | July 6, 1943 |

FOREIGN PATENTS

| Number | Country | Date |
| --- | --- | --- |
| 11,951 | Great Britain | Aug. 18, 1915 |
| 15,237 | Great Britain | June 25, 1914 |